Aug. 5, 1969    J. L. WEININGER ET AL    3,459,651
PROCESS OF CONTINUOUSLY FORMING BIPOLAR ELECTRODES BY
THE USE OF ELECTROPHORESIS
Filed May 2, 1966
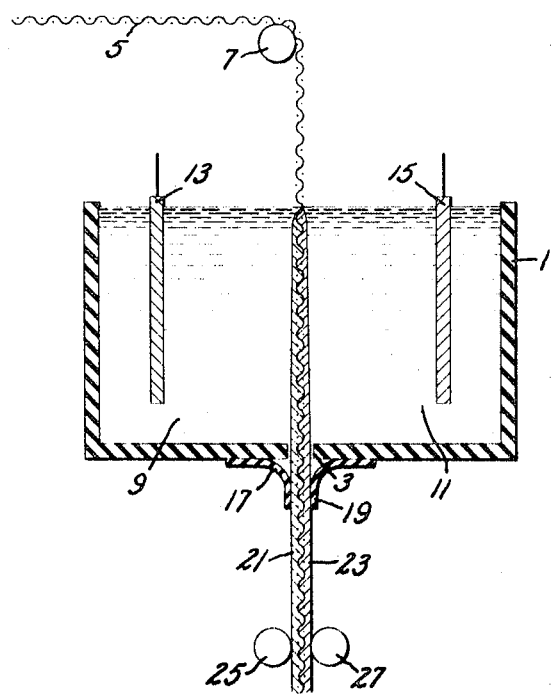
Inventors:
Joseph L. Weininger,
Thomas O. Rouse,
by Carl O. Thomas
Their Attorney.

3,459,651
PROCESS OF CONTINUOUSLY FORMING BIPOLAR ELECTRODES BY THE USE OF ELECTROPHORESIS
Joseph L. Weininger and Thomas O. Rouse, Schenectady, N.Y., assignors to General Electric Company, a corporation of New York
Filed May 2, 1966, Ser. No. 546,769
Int. Cl. C23b 13/00; H01m 35/10
U.S. Cl. 204—181                 15 Claims

ABSTRACT OF THE DISCLOSURE

A method of forming a bipolar Faure-type electrode is described which comprises positioning a conductive substrate having opposite faces within a chamber which has a different dispersion on opposite sides of the substrate and counter electrode. One dispersion contains a major amount by volume of a dielectric dispersing medium, a minor amount by volume of a chemically active material, and an activator to produce a negative electrode surface on the substrate. A second dispersion similar to the first dispersion is contained in the chamber on the opposite side of the substrate to produce a positive electrode surface on the substrate. The chemically active materials are deposited electrophoretically on the respective substrate surfaces.

---

Our invention relates to a process of continuously forming bipolar electrodes of the Faure-type by employing electrophoresis to deposit the chemically active portions.

The application of the phenomenon of electrophoresis to coating is well understood. Electrophoretic deposition has been widely employed to form dense insulative coatings of alumina and silica on electrical conductors. It has also been used to lay down refractory carbon and metal oxide electron emitter coatings on filaments for electron tubes. In the field of organic coatings, an electrophoretic technique to produce latex coatings was developed at the turn of the century, and recently electrophoresis has been adopted by industry as a painting technique.

Electrophoresis has a number of advantages as a coating technique. It is well known to produce smooth, uniform coatings. The quickness of the deposition renders the technique well suited to assembly-line requirements. Application in the painting industry has been stimulated by the ability of electrophoresis to achieve complete and uniform coatings on intricately shaped objects not readily painted by other procedures.

In 1882 United States Patent No. 252,002 was awarded to C. A. Faure for an improvement in Plante-type (metal plate) electrodes. Faure had noted that in reacting a Plante-type electrode the spongy reaction product formed on the surface of the plate tended to spawl or sluff in use. This reduced the capacity of the electrode formed by the plate and greatly interfered with the use of Plante-type electrodes in secondary cells. Faure suggested the use of an inert matrix to hold the spongy reactive material in place to prevent progressive loss of electrode capacity upon its being run through successive charge and discharge cycles. The Faure concept is still widely used today in forming electrodes. In the typical present-day electrode forming process a paste of active electrode material is spread on or impregnated into an inert metal grid or porous plaque which serves as the skeleton for the electrode and as a means for collecting electrical current from or delivering current to the active electrode material.

For a coating technique to be successfully applied to the manufacture of Faure-type electrodes it must yield an active material coating having a combination of qualities affecting conductivity, permeability, and adherency. It is for this reason that the formation of Faure-type electrodes has remained dependent on relatively slow and expensive coating procedures, such as hand pasting and batch impregnation. That electrophoretic coating techniques should produce coatings with an acceptable combination of qualities for use in Faure-type electrodes is unexpected.

Perhaps an outstanding deficiency of electrophoretically deposited coatings has been their tendency to sluff or spawl. Accordingly, the use of electrophoresis to form an electrode having as its fundamental aim the prevention of sluffing or spawling of active material would appear to run exactly counter to the clear teachings of both arts involved. This conclusion is further accented when it is considered that the active material deposited on a Faure-type electrode is employed in an environment much more conducive to spawling and sluffing than any of the environments in which electrophoretic coatings have been employed to date. In using electrophoretically deposited paint or insulation, the coating once positioned is normally intended to retain its chemical identity and, hence, its basic physical properties. By contrast, Faure-type electrodes cannot be used without subjecting the active material thereof to chemical change which would be expected to loosen the coating. In cycling electrodes the active material at one point in the cycle will have a first valence state and at another point in the charge cycle will exhibit a differing valence state. Thus, an electrode having zinc as an active material, for example, may be cycled between a first state in which it appears as a free metal and a second state in which two hydroxyl radicals are combined. In viewing the disparities of the physical properties of the metallic zinc and its hydroxide, the chances of obtaining an adequately adherent coating by electrophoresis in forming a Faure-type zinc electrode would appear to lie well beyond the realm of creditable prediction. The same general observations may be applied with respect to cadmium, nickel, copper, silver, and all other Faure-type electrodes.

The utility of electrophoretic deposition in forming electrodes is disclosed by Weininger et al. in commonly assigned application Ser. No. 546,853, filed May 2, 1966. Our present invention is directed to an improvement on this process as applied to the continuous formation of bipolar electrodes.

The formation of bipolar Faure-type electrodes by conventional techniques presents a number of disadvantages. According to one approach a positive and a negative electrode component are formed by conventional techniques and then laminated. The disadvantages of this approach are readily appreciated when it is considered that conventional electrode forming techniques are not suited for use in a continuous process. Typically a porous conductive substrate is employed which is impregnated with a chemically active material. To form electrodes of competitive efficiency substrates are required having high porosity, in the range of from 60 to 95 percent, and small pore sizes, less than 10 microns. High porosity is required to achieve a high proportion of chemically active material and hence a high electrode capacity per unit weight. At the same time it is very difficult by conventional techniques to fill large substrate pores. This limits the choice of suitable substrates to a small spectrum of relatively sophisticated and expensive high porosity-low pore size materials. Even using such materials it is necessary to repeat the step of impregnating the substrate in order to insure filling of the pores with chemically active material. In view of the difficulty in achieving impregnation it is, of course, essential that both sides of the substrate be open for impregnation. This means that the formation of the positive and negative electrode components must be conducted as separate forming processes.

Further, the formation of a bipolar Faure-type electrode requires something more than twice the effort required to form each electrode component separately, since there remains the additional step of laminating.

It is an object of our invention to provide a process for electrophoretically forming bipolar Faure-type electrodes.

It is another object to provide a process in which the steps of forming the electrode components and of laminating are consolidated.

It is a further object to provide a process which may be continuously used to form electrodes.

It is an additional object to provide a coating process which is relatively cheap and rapid as compared to coating processes now being used to form competitively similar products.

These and other objects of our invention are accomplished by providing a process of forming a bipolar Faure-type electrode comprising forming a first dispersion by the steps of mixing a major amount by volume of a dielectric dispersing medium and a minor amount by volume of finely divided particles of a chemically active material of a type used in forming Faure-type negative electrodes and of adding a first activator in an amount sufficient to produce charging of said particles. A second dispersion is formed by the steps of mixing a major amount by volume of a dielectric dispersing medium and a minor amount by volume of finely divided particles of a chemically active material of a type used in forming Faure-type positive electrodes and of adding a second activator in an amount sufficient to produce charging of said particles. A conductive substrate is positioned with a first face in contact with the first dispersion and a second face in contact with the second dispersion. First and second counter electrodes are positioned in contact with the first and second dispersions, respectively, and spaced from the conductive substrate. A potential difference is then established between each of the counter electrodes and the conductive substrate of proper polarity to attract the first and second activators to the substrate, thereby electrophoretically depositing the chemically active materials on the substrate.

Our invention may be better understood by reference to the following detailed description considered in conjunction with the drawing, which schematically illustrates an arrangement for the practice of our process.

Electrophoresis may be conveniently characterized by comparison with a dissimilar, but related coating technique, electrodeposition. In electrodeposition an ionically dissociable material is added to a solvent. To achieve coating, spaced electrodes are placed in contact with the solvent, and a potential difference is maintained therebetween. In the influence of the electrical field generated by the electrodes the cations formed by dissociation migrate toward the electrode exhibiting a negative polarity while their anionic counterparts migrate toward the electrode exhibiting a positive polarity. The ions are neutralized at the respective electrodes and a deposit may be formed at one or both electrodes, depending on the nature of the dissociable material chosen.

In electrophoresis it is intended to disperse finely divided particles in a medium in which the particles are substantially insoluble. Again, spaced electrodes are placed in contact with the medium and maintained at differing potentials. Since the particles, unlike ions, do not possess an electrical charge, no appreciable migration of particles can be produced through the influence of the electrical field formed by the electrodes without first activating the particles. This is accomplished by adding a small amount of a material of a type which is dissociable in the liquid medium to yield an ionic moiety adsorbable on the surface of the particles. The activated particles, exhibiting the charge contributed by the adsorbed ions, migrate in the electric field in a manner somewhat analogous to the mode of migration exhibited by ions per se in electrodeposition.

According to common usage in the battery are electrodes may be conveniently designated by the metal component making up the chemically active material of an electrode. Thus, the widely used nickel-cadmium cell, for example, is so designated since it is comprised of "nickel" electrodes and "cadmium" electrodes, the nickel electrodes being named for the chemically active nickel constituent associated with hydrogen and oxygen and the cadmium electrode being named by the chemically active cadmium electrode being named by the chemically active cadmium which may be in the form of a free metal or hydroxide. Our disclosure may be readily interpreted with reference to this conventional usage. Bipolar electrodes, such as nickel-cadmium electrodes, are similarly designated by referring to each of the chemically active electrode components.

According to our process the chemically active materials conventionally employed in forming the positive and negative electrode components of bipolar Faure-type electrodes are simultaneously deposited from deposition baths located on opposite sides of a conductive substrate, the chemically active material forming the negative electrode component being confined to one bath and the chemically active material forming the positive electrode component being confined to the remaining bath. Except for the chemically active material employed the positive and negative electrode component forming baths are substantially similarly constituted.

The material which is to form each chemically active portion of the bipolar Faure-type electrode is initially formed into finely divided particles. The size of the particles is not critical but is chosen primarily for ease of dispersion in a liquid medium. Above a mean particle diameter of appoximately 100 microns the process is unnecessarily burdened with the necessity of vigorously agitating the dispersing medium to prevent settling of the particles. Although colloid size particles may be readily maintained in dispersion with minimal agitation, their use is not preferred, since they are relatively expensive to produce as compared to larger particle sizes. It is generally preferred to use particles ranging in mean diameter from 1 to 100 microns, since they may be maintained in dispersion with only mild agitation and yet are relatively inexpensive to obtain.

A dispersant for the finely divided particles of each chemically active material is chosen from a dielectric liquid in which the particles are substantially insoluble. Dispersants of low viscosity are generally preferred over those of higher viscosity, since viscosity is an index of mobility impedance within the dispersant, although higher viscosity fluids may be usefully employed in some applications to reduce the tendency of the particles to settle. Typical of low-cost, readily available dispersants suitable for use in our inventive process are water, lower molecular weight alcohols and ketones, and miscible combinations thereof.

To charge the finely divided particles within each dispersant an activator is employed. As used in the art, the term "activator" has the recognized meaning of designating a material ionically dissociable in the dispersant to produce an ionic moiety which is adsorbable by the particles. Only a very small quantity of activator need be present in each dispersant to charge the particles. On the other hand, the process is not materially affected by excess quantities of activator.

Activators of a wide range of chemical compositions are known to the art. Typical known activators include tannic acid, chromic hydroxide, various forms of cellulose, prolamine, and various salts. For our applications we prefer to use a salt of a metal corresponding to the metal constituent of the active material to be deposited. We have specifically found hydrated metal nitrate salts to be well suited to our applications. Use of corresponding metal salts are preferred, since in this way alternation of the potential characteristics of the active material in the electrode is minimized. The use of such metal ions produces only positively charged activators, however, and other activators must be used where anodic deposition is desired. For positive electrode deposition we have found various ionizable forms of cellulose to be quite suitable.

In addition to finely divided particles of chemically active material and the activator therefor it is anticipated that still additional materials may be incorporated in each dispersion, although we have not found the use of additional materials to be essential. One of the materials which we propose to additionally include is an electrical conductor. The electrically conductive material may take the form of finely divided particles in the same general size range as the chemically active particles. The conductive material particles may be activated along with the chemically active particles and codeposited therewith. As is well understood in the art the proportion of a specific type of particles electrophoretically codeposited corresponds to the proportion of such particles present in the dispersion. Thus, the composition of the codeposit may be easily controlled. We have found carbon and carbonyl nickel particles to be particularly well suited for codeposition with particles of chemically active material.

Simultaneous electropheretic deposition of dissimilar materials from the same bath is, of course, only one method whereby an electrically conductive material may be incorporated in each chemically active electrophoretic coating. Another technique which readily lends itself to industiral application is the electrodeposition of an electrically conductive metal simultaneous with electrophoretic deposition of the chemically active particles. According to this technique a quantity of metal ion releasing material may be dissolved in the dispersant.

The use of various types of other additives has heretofore been suggested in the art. For the most part these additives fall in the categories of binders and defloccu-lents. We have found that our processes do not require the use of such additives; however, we do not feel that the use of various conventional additives to perform their known functions would be inconsistent with the practice of our invention.

The proportion of materials used in forming a dispersion for electrophoretic deposition is not ciritical. To insure adequate mobility and freedom from agglomeration of dispersed particles it is preferred to employ a major amount by volume of dispersant. The finely divided particles of chemically active material may be used in any dispersable amount. It is preferred that the particles not exceed a minor amount by volume of the dispersion. The various functional additives such as activators, electrically conductive materials, etc., are usually incorporated in the minimum amount sufficient to achieve their function. The reason for this is that excess amounts of such additives displace chemically active material from the finished electrode, thereby decreasing its capacity. It is recognized that amounts of additives in excess of the functionally minimal amounts may be incorporated without otherwise adversely affecting the electrodes formed, and in many applications it may be desirable to incorporate somewhat in excess of the minimum amount of functional additive merely to insure that the minimal amount is at all times present. It is generally preferred that activators be held to less than 1 percent by volume of the dispersion while additives intended merely to improve the electrical conductivity of the electrode be held to less than 30 percent by volume of the dispersion.

In order to facilitate activation of the chemically active material for a Faure-type electrode, we prefer to electrophoretically deposit such material in a form in which the chemically acting metal constituent is at least partially oxidized. This may be a chemically oxidized form corresponding to an oxidized form of the metal produced in cell use. Alternately, the chemically active metal constituent may be oxidized for purposes of electrophoresis to a form which may be conveniently converted to a chemical form having utility in cell construction.

For example, in forming a Group II–B metal electrode component, such as a cadmium component, for use in a cell having a nickel or functionally similar opposite polarity component, it is desirable to disperse finely divided particles of cadmium hydroxide for electrophoretic deposition, since these particles may be more readily activated than particles of the Group II–B metal. The electrophoretic deposition of the hydroxide particles on a suitable conductive substrate will form a fully discharged cadmium electrode component, which may be charged for use by conventional procedures. It is not necessary that the Group II–B metal be deposited in the identical oxidized form that it assumes in cell use. To illustrate, finely divided particles of cadmium oxide may be deposited instead of particles of the hydroxide. Conversion of the oxide after deposition to cadmium hydroxide is readily accomplished merely by contacting the coating with an alkaline solution, such as potassium hydroxide. Since alkaline electrolytes are widely employed in combination with cadmium electrodes, this final conversion may be postponed until after cell assembly, if desired.

While not essential to the practice of our invention, we have discovered that bipolar Faure-type electrodes of superior adherency can be produced by depositing the chemically active material in the form of an oxide.

As set out above by way of example the active material for a Group II–B metal electrode component, such as a cadmium electrode component, may be electrophoretically deposited as either cadmium hydroxide or cadmium oxide. While it might seem that the deposition of cadmium hydroxide would be preferable over the deposition of cadmium oxide, inasmuch as the latter coating technique requires the additional step of treatment for conversion to cadmium hydroxide, the latter technique is actually much to be preferred in that it produces coatings of greater adherency than the former technique.

While Group II–B metal electrode components may be usefully electrophoretically deposited in the form of oxides, we do not wish to imply that this exemplary technique should be used in all instances to form Faure-type electrode components, regardless of composition. In the case of nickel electrode components, for example, a coating of nickel oxide may be easily formed according to our process which may find utility as an electrical insulation. This material, however, is not conveniently convertible into the hydroxide form used in nickel-cadmium, nickel-zinc, and similar type bipolar electrodes.

We may electrophoretically deposit onto any conventional conductive substrate for bipolar Faure-type electrodes. Plates, grids, sintered plaques, etc., have been heretofore used a bipolar Faure-type electrode substrates. We prefer the use of porous conductive substrates having an average pore diameter at least ten times greater than the average particle diameter of the coating material to be deposited. It is noted that our process is most economically practiced with particle sizes in excess of 1 micron; hence, we prefer to employ substrates having pore sizes in excess of 10 microns. To insure complete filling of the pores we prefer to use substrates having surface opening pores which are substantially free of intermediate constrictions. Punched grids, expanded metal, woven screens, etc., are exemplary of such substrates. A highly preferred substrate for many applications is foamed metal, a material which meets each of the above qualifications and which is formed of large pores in the order of 30 mils or more which open without restrictions into each other and into the surfaces. Foamed metals are available having porosities as high as 95 percent. Porous substrates useful in the practice of our invention are disclosed by Weininger et al. in commonly assigned application Ser. No. 546,853, filed May 2, 1966. As a distinctive feature of our invention we anticipate the use of composite substrates having a central layer of either non-conductive or conductive material which may be either porous or non-porous. It is anticipated that such a central layer, while not required, may improve the separation of positive and negative component chemically active materials during the initial stages of deposition. Where a porous central layer is employed for this purpose it should in most instances have a lower porosity and/or pore size than the outer layers of the substrate. It is appreciated that any non-conductive central layer should be related to the outer layer to permit electrical conductivity therebetween whenever the bipolar electrode is to be incorporated in a battery having series related cells.

The manipulative aspects of our invention are best understood by reference to the drawing. As schematically shown a liquid tank 1 is provided having a centrally positioned slot 3 therein. A conductive substrate 5 extends over the guide 7 and through the slot thereby partitioning the tank into a first chamber 9 and a second chamber 11. A first dispersion containing a chemically active material to form a negative polarity electrode component is positioned in the first chamber, and a second dispersion containing a chemically active material to form a positive polarity electrode component is positioned in the second chamber. A first counter electrode 13 is immersed in the first dispersion and a second counter electrode 15 is immersed in the second dispersion. To insure against leakage of the dispersions between the slot and the substrate wiper seals 17 and 19 are shown.

According to an exemplary mode of practicing our process, the tank, substrate, and counter electrodes are brought into the arrangement illustrated. A potential difference is established between each of the counter electrodes and the substrate of proper polarity to deposit chemically active material on opposite sides of the substrate. The first and second dispersions are then added to the first and second chambers and a bipolar Faure-type electrode is formed by electrophoretic deposition which forms negative and positive polarity chemically active electrode components 21 and 23, respectively. The coating thickness is controlled by the rate at which the substrate is passed through the tank, the potential difference between each of the counter electrodes and the substrate, the concentration of the chemically active material within each dispersion bath, and the spacing of each counter electrode from the substrate. As an optional feature pressure rolls 25 and 27 are illustrated to press and thereby improve the adherency of the active material coatings.

The practice of our invention may be conveniently exemplified by describing the process of forming a bipolar nickel-cadmium electrode. The substrate 5 is chosen of a suitable electrically conductive material such as nickel screen. According to the preferred practice it would be desirable to use identical dispersants to form the first and second baths. The dispersion to be used in the first chamber would preferably contain cadmium in an oxidized form such as cadmium hydroxide or oxide, the latter being preferred, since it additionally offers the advantages previously discussed in being subsequently hydratable. The dispersion to be used in the second chamber would preferably include divalent nickel hydroxide. Since nickel releases only a single electron per molecule on oxidation whereas cadmium requires two electrons per molecule for reduction, it is necessary that twice the molar amount of nickel be deposited as cadmium in order to achieve a bipolar electrode having electrode components of equal capacity. One technique of achieving this would be to add twice the molar concentration of nickel compound to the second dispersion as compared to the molar concentration of cadmium compound in the first dispersion. Alternately, the potential difference between the first counter electrode and the substrate may be maintained at half the potential difference between the second counter electrode and the substrate. As another alternative, the spacing of the counter electrodes may be varied so that the second counter electrode is twice as close to the substrate as the first counter electrode. Finally, any combination of these techniques may be used to obtain the proper capacity ratio of the electrode components to be formed.

The polarity of the counter electrodes necessary to produce deposition on the substrate is a function of the activator chosen. In the exemplary situation where cadmium nitrate is chosen as the activator for the first dispersion and nickel nitrate is chosen as the activator for the second dispersion, both the finely divided particles of cadmium in the first dispersion and the finely divided particles of nickel in the second dispersion will be positively charged. In such case both counter electrodes would be maintained at a positive polarity with respect to the substrate. If a negative charging activator were chosen, this would be reversed. Further, if a positive charging activator such as the nitrate salt of the metal is chosen for one dispersion and a negative charging activator such as a cellulose ether is chosen for the remaining dispersion, the counter electrode in contact with the positively charged dispersion would be maintained positive with respect to the substrate while the counter electrode in contact with the negative charged dispersion would be maintained negative with respect to the substrate.

In most applications of our process it is expected that the coating thickness may be best controlled by varying the speed at which the substrate is passed through the tank. This allows the continuous formation of a bipolar electrode of any desired capacity. It is recognized, of course, that it is not necessary that the substrate move continuously during coating, although this technique is very advantageous. The substrate may alternately be intermittently repositioned. Also, the tank may be moved while the substrate remains stationary.

While we have disclosed our invention with reference to a process of forming a bipolar Faure-type electrode, it is appreciated that it is not limited thereto. For example, we consider our process to be excellently suited to repairing bare spots on or improving the coating uniformity of bipolar Faure-type electrodes. Many conventional methods of forming bipolar Faure-type electrodes suffer the disadvantages of failing to uniformly cover the conductive substrate with chemically active material. The substrate is usually formed of a material of higher electrical conductivity than the active material. When a conventional bipolar Faure-type electrode is placed in contact with an electrophoretic dispersion and used to generate an electrical field therein, the finely divided particles of chemically active material will deposit on each unit area of the electrode in inverse proportion to the coating thickness. This is because the rate of deposition on each unit area is directly related to its electrical potential. The surface of a unit area which has a relatively thick coating exhibits a lower potential to the dispersion than the surface of a unit area which is bare or thinly coated, the difference in potentials being attributable to the differing effective resistances represented by the differing coating thicknesses. Since bare spots have no coating thereon, they exhibit the maximum attractive force obtainable at any given potential and are preferentially coated. It may thus be seen that our inventive process has utility in the repair and quality control of bipolar Faure-type electrodes formed by any conventional technique.

While the historic development of Faure-type electrodes has been associated with secondary cells, it is appreciated that electrodes formed according to ur process may be used in either primary or secondary cells. This aspect of our invention is best illustrated by reference to a bipolar Faure-type electrode having a zinc component of a type commonly employed in primary cells. To achieve one or more of the process advantages heretofore discussed we prefer to electrophoretically deposit the zinc chemically active constituent in the form of calcium zincate, zinc oxide, or zinc hydroxide. To use the zinc component electrode in a primary cell it is, of course, desirable to reduce the zinc to the metallic form. This may be accomplished by employing any conventional charging technique. In applying our process generally to the formation of electrodes for primary cells it is preferred to electrophoretically deposit the active material in a form in which the active metal constituent is at least partially oxidized. For certain types of primary electrodes the oxidized form may correspond to the form of the coating having utility in a primary electrode. Note, for example, the manganese dioxide electrode of the common dry cell. In other instances it may be necessary to choose the oxidized form for deposition such that it may be reduced to a form useful as a primary electrode.

What we claim as new and desire to secure by Letters Patent of the United States is:

1. A process of forming a bi-polar Faure-type electrode comprising:

forming a first dispersion by the step of mixing a major amount by volume of a dielectric dispersing medium and a minor amount by volume of finely divided particles of a chemically active material of a type used in forming Faure-type negative electrodes and the step of adding a first activator material ionically, dissociable in the dispersing medium in an amount sufficient to produce charging of said particles, forming a second dispersion by the step of mixing a major amount by volume of a dielectric dispersing medium and a minor amount by volume of finely divided particles of a chemically active material of a type used in forming Faure-type positive electrodes and the step of adding a second activator material ionically dissociable in the dispersing medium in an amount sufficient to produce charging of said particles, positioning a conductive substrate with a first face in contact with said first dispersion and a second face in contact with said second dispersion thereby maintaining separation of the dispersions, positioning first and second counter electrodes in contact with said first and second dispersions, respectively, and spaced from said conductive substrate, and establishing a potential difference between each of said counter electrodes and said conductive substrate of proper polarity to attract said first and second activators to said substrate, thereby electrophoretically depositing said chemically active materials on said substrate.

2. A process of forming a bipolar Faure-type electrode according to claim 1 in which the substrate is continuously moved with respect to the dispersions.

3. A process of forming a bipolar Faure-type electrode according to claim 1 in which the chemically active material included in the first dispersion is a reducible metal compound.

4. A process of forming a bipolar Faure-type electrode according to claim 3 in which the reducible metal compound is a Group II–B metal hydroxide.

5. A process of forming a bipolar Faure-type electrode according to claim 3 in which the reducible metal compound is cadmium hydroxide.

6. A process of forming a bipolar Faure-type electrode according to claim 3 in which the reducible metal compound is zinc hydroxide.

7. A process of forming a bipolar Faure-type electrode according to claim 1 in which the chemically active material included in the second dispersion is an oxidizable metal compound.

8. A process of forming a bipolar Faure-type electrode according to claim 7 in which the oxidizable chemical compound is divalent nickel hydroxide.

9. A process of forming a bipolar Faure-type electrode comprising:

forming a first dispersion by the step of mixing a major amount by volume of a dielectric dispersing medium and a minor amount by volume of finely divided particles of a Group II–B metal oxide and the step of adding a first activator material ionically dissociable in the dispersing medium in an amount sufficient to produce charging of the particles, forming a second dispersion by the step of mixing a major amount by volume of a dielectric dispersing medium and a minor amount by volume of finely divided particles of a chemically active material of a type used in forming Faure-type positive electrodes and the step of adding a second activator material ionically dissociable in the dispersing medium in an amount sufficient to produce charging of said particles, positioning a conductive substrate with a first face in contact with said first dispersion and a second face in contact with said second dispersion thereby maintaining separation of the dispersions, positioning first and second counter electrodes in contact with said first and second dispersions, respectively, and spaced from said conductive substrate, establishing a potential difference between each of said counter electrodes and said conductive substrate of proper polarity to attract said first and second activators to said substrate, thereby electrophoretically depositing said chemically active materials on said substrate, and converting the Group II–B metal oxide particles deposited on the substrate to the corresponding hydroxide.

10. A process according to claim 1 in which the activators produce charging of like polarity of the particles incorporated in the first and second dispersions and the counter electrodes are maintained at a corresponding polarity.

11. A process according to claim 1 in which one of the activators produces negative polarity charging of the particles in contact therewith, the remaining of the activators produces positive polarity charging of the particles in contact therewith, the counter electrodes are maintained at a polarity corresponding to the polarity of the charged particles in contact therewith, and the substrate is maintained at a potential intermediate the potential of the counter electrodes.

12. A process according to claim 1 in which the substrate is a composite structure formed of a first porous portion adjacent the first face, a second porous portion adjacent the second face, and a central portion of less porosity than said first or second porous portions.

13. A process of continuously forming a bipolar Group II–B metal-nickel Faure-type electrode comprising:

forming a first dispersion by the step of mixing a major amount by volume of a dielectric dispersing medium and a minor amount by volume of finely divided particles of a chemically active material chosen from the class consisting of Group II–B metal oxides and Group II–B metal hydroxides and the step of adding a Group II–B metal salt in an amount sufficient to produce charging, forming a second dispersion by the step of mixing a major amount by volume of a dielectric dispersing medium and a minor amount by volume of finely divided particles of divalent nickel hydroxide and the step of adding a nickel salt in an amount sufficient to produce charging, continuously feeding a conductive substrate between the dispersions with a first face in contact with the first dispersion and a second face in contact with the second dispersion thereby maintaining separation of the dispersions, and maintaining each of said counter electrodes at a positive potential with respect to the substrate.

14. A process according to claim 13 in which the substrate is foamed metal.

15. A process according to claim 13 in which the substrate is porous and exhibits an average pore size at least ten times greater in diameter than the average diameter of the particles.

References Cited

UNITED STATES PATENTS

| | | | |
|---|---|---|---|
| 2,075,331 | 3/1937 | Antisell | 204—28 |
| 2,530,546 | 11/1950 | Snyder | 204—181 |
| 2,913,385 | 11/1959 | Satriana et al. | 204—181 |
| 2,982,707 | 5/1961 | Scheible | 204—181 |
| 3,214,355 | 10/1965 | Kandler. | |
| 3,258,361 | 6/1966 | Kahn | 136—29 |
| 3,300,343 | 1/1967 | Huber et al. | |
| 3,359,190 | 12/1967 | Cooke et al. | 204—28 |

JOHN H. MACK, Primary Examiner

E. ZAGARELLA, Jr., Assistant Examiner

U.S. Cl. X.R.

136—10